United States Patent
Katayama et al.

(10) Patent No.: US 8,127,813 B2
(45) Date of Patent: Mar. 6, 2012

(54) PNEUMATIC TIRE FOR TWO-WHEELED VEHICLE

(75) Inventors: Shinsaku Katayama, Kodaira (JP); Makoto Ishiyama, Kodaira (JP); Masafumi Koide, Kodaira (JP); Takashi Kawai, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 927 days.

(21) Appl. No.: 12/093,255

(22) PCT Filed: Nov. 10, 2006

(86) PCT No.: PCT/JP2006/322471
§ 371 (c)(1),
(2), (4) Date: May 9, 2008

(87) PCT Pub. No.: WO2007/055322
PCT Pub. Date: May 18, 2007

(65) Prior Publication Data
US 2009/0173420 A1    Jul. 9, 2009

(30) Foreign Application Priority Data
Nov. 11, 2005   (JP) .................................. 2005-327534

(51) Int. Cl.
*B60C 1/00* (2006.01)
*B60C 11/00* (2006.01)
(52) U.S. Cl. ................................. 152/209.5; 152/209.11
(58) Field of Classification Search ............... 152/209.5, 152/209.11
See application file for complete search history.

(56) References Cited

U.S. PATENT DOCUMENTS

| 6,286,575 B1 * | 9/2001 | Nakamura .................... 152/526 |
| 2003/0000616 A1 * | 1/2003 | Watkins et al. ............ 152/209.5 |
| 2006/0102266 A1 * | 5/2006 | Ravasio et al. ............. 152/209.5 |

FOREIGN PATENT DOCUMENTS

| JP | 07-108805 A |   | 4/1995 |
| JP | 08-072505 A |   | 3/1996 |
| JP | 09-226319 A |   | 9/1997 |
| JP | 10-119513 A |   | 5/1998 |
| JP | 2000-158910 | * | 6/2000 |

(Continued)

OTHER PUBLICATIONS

Machine translation for Japan 2000-158910 (no date).*

*Primary Examiner* — Steven D Maki
(74) *Attorney, Agent, or Firm* — Sughrue Mion, PLLC (57) ABSTRACT

The pneumatic tire for two-wheeled vehicles including a plurality of tread rubbers constituting a tread wherein a region occupying 15 to 35% in the center of a stretched tread width, which is obtained by stretching the tread with respect to a tire equatorial plane as the center, is defined as a tread central section; the remaining regions at both ends are defined as tread side sections; regions in the respective tread side sections each occupying 4 to 13% from the corresponding tread end toward the center of the stretched tread width are defined as side-section shoulder-end regions; and the remaining regions of the respective tread side sections are defined as side-section near-center regions, a modulus of the tread rubbers for the side-section shoulder-end regions at 100% elongation is smaller than a modulus of the tread rubbers for the side-section near-center regions at 100% elongation, at least at a tread surface.

8 Claims, 3 Drawing Sheets

FOREIGN PATENT DOCUMENTS

| | | |
|---|---|---|
| JP | 2000-158910 A | 6/2000 |
| JP | 2002-316512 A | 10/2002 |
| JP | 2003-011614 A | 1/2003 |
| JP | 2004-067058 A | 3/2004 |
| JP | 2004-067059 A | 3/2004 |
| JP | 2005-022622 A | 1/2005 |
| JP | 2005-219733 A | 8/2005 |
| JP | 2007-131228 A | 5/2007 |

* cited by examiner

PNEUMATIC TIRE FOR TWO-WHEELED VEHICLE

TECHNICAL FIELD

The present invention relates to pneumatic tires for two-wheeled vehicles (hereinafter also referred to as simply "tires") having excellent steering stability performance during high-speed traveling, and particularly to pneumatic tires for two-wheeled vehicles having excellent steering stability performance during turning in which a vehicle body is significantly tilted.

BACKGROUND ART

High-performance pneumatic tires for two-wheeled vehicles, which are subjected to high-speed rotation, are greatly affected by centrifugal force. This causes outward expansion of the tires at treads thereof in the tire radial direction. Consequently, steering stability performance may be degraded. For such a reason, reinforced structures have been developed in which a reinforcing member is spirally wound around the crown of a tire thereof in such a manner as to be substantially parallel to the tire equatorial plane so that the expansion at the tread is suppressed. Examples of such a reinforcing member spirally wound parallel to the tire equatorial plane include nylon fiber, aromatic polyamide fiber (Kevlar: a trade name), steel and the like. Particularly, aromatic polyamide fiber and steel, which have the characteristic of not expanding easily even at high temperature, can suppress the expansion at the tread and therefore are attracting attention as effective materials for high-performance tires. By winding the reinforcing member around the crown of a tire, a so-called "hoop" effect can be enhanced. Thus, a deformation in which the tire tends to expand at the crown thereof in the tire circumferential direction because of a centrifugal force applied during high-speed rotation can be suppressed. Therefore, many patent applications (Patent Documents 1 to 5, for example) have been made in which such a reinforcing member (hereinafter referred to as a "spiral member") is spirally wound around the crown of a tire.

It is known that tires having these spiral members wound therearound (tires having spiral belts) have excellent steering stability performance during high-speed traveling and very high traction. However, even with a tire having a spiral member wound therearound, the steering stability performance during turning in which a vehicle (motorcycle) is significantly tilted is not necessarily improved markedly. Moreover, some users and racing riders have a demand for an increase in gripping force during turning in which a motorcycle is significantly tilted.

In response to this, Patent Document 6, for example, discloses a pneumatic tire for two-wheeled vehicles. The tread of this tire, having a spiral belt structure, is divided into three parts (a central region and two side regions of the tread) in the tire axial direction. Tread rubbers for the two side regions have a JIS(A) hardness and a ratio of loss tangent to the dynamic complex modulus of elasticity larger than those of a tread rubber for the central region. With this structure, the lateral rigidity of the spiral structure, which is originally low, is enhanced. Further, since sufficient gripping force during turning is ensured, cornering force and camber thrust are improved, whereby excellent turning performance can be obtained.

In a pneumatic tire for two-wheeled vehicles disclosed in Patent Document 7, a tire tread provided with a circumferential belt layer (equivalent of the spiral belt layer herein) is divided into a central region whose width is 0.2 to 0.4 times a stretched tread width and whose center coincides with the center of the tire tread width, and shoulder regions on both sides of the central region. These regions have different moduli at 100% elongation at least at the grounding surfaces thereof at room temperature. In this case, when the aforementioned moduli of the shoulder regions are set larger than that of the central region, vibration absorbability during linear traveling can be improved and occurrence of shimmy can be prevented, whereby linear traveling stability can be ensured. When the moduli of the shoulder regions are set smaller than that of the central region, high-speed durability and steerability can be improved.

Patent Document 1: Japanese Unexamined Patent Application Publication No. 2004-067059
Patent Document 2: Japanese Unexamined Patent Application Publication No. 2004-067058
Patent Document 3: Japanese Unexamined Patent Application Publication No. 2003-011614
Patent Document 4: Japanese Unexamined Patent Application Publication No. 2002-316512
Patent Document 5: Japanese Unexamined Patent Application Publication No. 09-226319
Patent Document 6: Japanese Unexamined Patent Application Publication No. 07-108805
Patent Document 7: Japanese Unexamined Patent Application Publication No. 2000-158910

DISCLOSURE OF THE INVENTION

Problems to be Solved by the Invention

In a pneumatic tire for two-wheeled vehicles, since a two-wheeled vehicle is turned while tilting the vehicle body, the tire tread contacts the ground at different portions during linear traveling and during turning. Specifically, a central portion of the tread is used during linear traveling, and a side portion of the tread is used during turning. The types of required tire performance are also different during linear traveling and during turning. During linear traveling, a grip with respect to an input (i.e., acceleration or deceleration) in the tire circumferential direction (a direction around the tire equatorial plane) is required. During turning, a grip with respect to an input in the tire lateral direction (a direction of the tire width) is required.

To turn a two-wheeled vehicle at a high speed, the vehicle body needs to be tilted significantly so as to counterbalance the centrifugal force that increases with the turning speed. Additionally, the tire needs to have a sufficient grip to allow for the centrifugal force. That is, if the grip of the tire at the time when the vehicle body is significantly tilted is insufficient, it may be impossible to turn the vehicle at a high speed. Therefore, grip has a significant influence over performance during turning.

The spiral belt described above can suppress expansion (outward swelling) of the tire under high-speed rotation. This gives excellent steering stability particularly during high-speed traveling. However, a tire having the spiral belt has a characteristic of suppressing a deformation of expansion of the tire crown portion in the tire circumferential direction. This tends to reduce the contact area between the ground and the tire. Since grip when the body of a two-wheeled vehicle is tilted is greatly affected by the contact area, a structure having the spiral belt tends to have a low grip during turning and therefore tends to prevent turning at a high speed.

It is an object of the present invention to solve the above-described problems in pneumatic tires for two-wheeled vehicles that include spiral belts and to provide a pneumatic tire for two-wheeled vehicles having excellent steering stability performance during high-speed traveling while having excellent steering stability performance during turning, in which the vehicle body is significantly tilted, with improved grip performance during turning.

Means for Solving the Problems

To solve the above-described problems, the present inventors made a diligent study of grip characteristics of tires having spiral belts, particularly in view of the frictional grip of rubbers. As a result, the inventors have found that grip can be improved by using a soft rubber only for portions (near tread ends), which are more specific than the ones defined in Patent Documents 6 and 7, that contact the ground when the vehicle body is significantly tilted, and that the loss of grip due to reduction of the contact area can be offset by the improved grip. Thus, the inventors have realized the present invention.

According to the present invention, a pneumatic tire for two-wheeled vehicles includes a bead core embedded in each of a pair of left and right bead sections; a carcass constituted by at least one carcass ply toroidally extending from one of the bead sections to the other bead section, with ends of the carcass ply either anchored to the respective bead cores by being wrapped therearound or by being held therein, or affixed to the respective bead cores; a belt layer provided on an outer side, in a tire radial direction, of the carcass; and a plurality of tread rubbers provided on an outer side, in the tire radial direction, of the belt layer and constituting a tread to be brought into contact with the ground. The belt layer includes a spiral belt layer formed by spirally winding a belt-like member in which a single cord or a plurality of parallel cords are embedded in a coating rubber. When a region occupying 15 to 35% in the center of a stretched tread width, which is obtained by stretching the tread with respect to a tire equatorial plane as the center, is defined as a tread central section; the remaining regions at both ends of the tread are defined as tread side sections; regions in the respective tread side sections each occupying 4 to 13% from the corresponding tread end toward the center of the stretched tread width are defined as side-section shoulder-end regions; and the remaining regions of the respective tread side sections are defined as side-section near-center regions, a modulus M1 of the tread rubbers for the side-section shoulder-end regions at 100% elongation is smaller than a modulus M2 of the tread rubbers for the side-section near-center regions at 100% elongation, at least at a tread surface.

In the present invention, the tread is divided into the tread central section and the tread side sections, the tread side sections each being further divided into regions defined as the side-section shoulder-end region and the side-section near-center region. The stretched tread width means the width of the tread when the tread is stretched, that is, the tread curving in the tire width direction is flattened so as to have a linear width. In the present invention, where the stretched tread width is defined as 100%, a region occupying 15 to 35% in the center of the stretched tread width is defined as the tread central section, the remaining regions at both ends of the tread are defined as the tread side sections, regions in the respective tread side sections each occupying 4 to 13% from the corresponding tread end toward the tire equatorial plane are defined as the side-section shoulder-end regions, and the remaining regions of the respective tread side sections are defined as the side-section near-center regions.

This definition is for setting different moduli of tread rubber for the side-section near-center region used during high-speed traveling and for the side-section shoulder-end region that contacts the ground only during low-speed turning with the vehicle body significantly tilted. The above-described definitions of the regions only apply to the tread surface. Rubbers used for adjoining regions may overlap each other in cross section taken along the tire width direction.

The present invention provides that the modulus M1 of the tread rubbers for the side-section shoulder-end regions at 100% elongation is set to a value smaller than the modulus M2 of the tread rubbers for the side-section near-center regions at 100% elongation. These moduli represent the moduli of elasticity of the rubbers. The larger modulus a rubber has, the more difficult it is to deform the rubber. Therefore, in this specification, a rubber having a large modulus is expressed as a hard rubber, and a rubber having a small modulus is expressed as a soft rubber.

Since the tire according to the present invention includes the spiral belt layer, the rigidity in the tire circumferential direction is high. On the other hand, since a rubber softer than the rubber used for each side-section near-center region is used for each side-section shoulder-end region that contacts the ground when the vehicle is turned with the vehicle body significantly tilted, frictional grip is improved and therefore grip performance is improved, whereby excellent steering stability performance during turning is obtained. Further, since the rigidity in the tire circumferential direction improved by the use of the spiral belt layer suppresses the outward swelling of the tread in the tire radial direction during high-speed traveling, excellent high-speed durability and excellent high-speed steering stability performance can be obtained. Consequently, the pneumatic tire for two-wheeled vehicles according to the present invention has excellent steering stability performance during high-speed traveling while having excellent steering stability performance during turning, in which the vehicle body is significantly tilted, with improved grip performance during turning.

If the width of the side-section shoulder-end region is set to a value smaller than 4% of the stretched tread width, the side-section shoulder-end region becomes too narrow, and the degree of improvement in grip performance becomes insufficient. In contrast, if the side-section shoulder-end region has a width larger than 13% of the stretched tread width, the degree of improvement in grip performance becomes high, but the degree of degradation in wear performance also becomes high because of the softness of the tread rubber. Therefore, the width of the side-section shoulder-end region needs to be set to 4 to 13% of the stretched tread width.

In the pneumatic tire for two-wheeled vehicles according to the present invention, it is preferable that a ratio M1/M2 of the modulus M1 of the tread rubbers for the side-section shoulder-end regions at 100% elongation to the modulus M2 of the tread rubbers for the side-section near-center regions at 100% elongation falls within $0.3 \leq M1/M2 \leq 0.95$, and more preferably within $0.5 \leq M1/M2 \leq 0.9$.

The modulus M1 of the side-section shoulder-end regions obtained when the ratio M1/M2 of the modulus M1 to the modulus M2 is $0.3 > M1/M2$ is too small. Although this is very effective for improving grip performance of the side-section shoulder-end regions during turning with the vehicle body significantly tilted, the tread rubber may wear easily because of the high softness. In contrast, in the case of $M1/M2 > 0.95$, the modulus M1 is too large. In such a case, the degree of improvement in grip performance is low because the tread rubbers of the side-section shoulder-end regions that contact the ground during turning with the vehicle body significantly tilted are too hard.

In the pneumatic tire for two-wheeled vehicles according to the present invention, it is also preferable that the modulus M2 of the tread rubbers for the side-section near-center regions at 100% elongation is smaller than a modulus MC of the tread rubber for the tread central section at 100% elongation, at least at the tread surface. By setting the moduli of the tread rubbers for the tread central section and the side-section near-center regions as described above and thus using softer rubbers for the side-section near-center regions compared to the rubber used for the tread central section, frictional grip of the side-section near-center regions that contact the ground during turning is improved. Consequently, grip performance in the tire lateral direction (a direction of the tire width) can be advantageously improved.

In the pneumatic tire for two-wheeled vehicles according to the present invention, it is also preferable that a ratio M2/MC of the modulus M2 of the tread rubbers for the side-section near-center regions at 100% elongation to the modulus MC of the tread rubber for the tread central section at 100% elongation falls within $0.3 \leq M2/MC \leq 0.95$, and more preferably within $0.5 \leq M2/MC \leq 0.9$.

The modulus M2 of the tread rubber for the side-section near-center regions obtained when the ratio M2/MC of the modulus M2 to the modulus MC is $0.3 > M2/MC$ is too small. Although this improves frictional grip during turning and thus improves grip performance, wear of the tread rubbers may be accelerated because of the high softness. In contrast, in the case of $M2/MC > 0.95$, the modulus M2 is too large. In such a case, the tread rubbers for the side-section near-center regions are too hard. This makes it difficult to ensure a sufficient contact area during turning and therefore produces little effect of improving grip performance.

Advantages of the Invention

By constructing the pneumatic tire for two-wheeled vehicles according to the present invention as described above, the pneumatic tire can have excellent steering stability performance during high-speed traveling while having excellent steering stability performance during turning, in which the vehicle body is significantly tilted, with improved grip performance during turning.

REFERENCE NUMERALS 10 pneumatic tire for two-wheeled vehicles
16 carcass
18 bead section
20, 20a, 20b bead core
22 spiral belt layer
28 tread
30 tread rubber
30A tread rubber (tread rubber for side-section shoulder-end region)
30B tread rubber (tread rubber for side-section near-center region)
30C tread rubber (tread rubber for tread central region)

BEST MODE FOR CARRYING OUT THE INVENTION

A preferred embodiment of a pneumatic tire for two-wheeled vehicles according to the present invention will now be described with reference to FIG. 1. A pneumatic tire 10 for two-wheeled vehicles according to the present embodiment is of a size 190/50ZR17.

Figure 1:
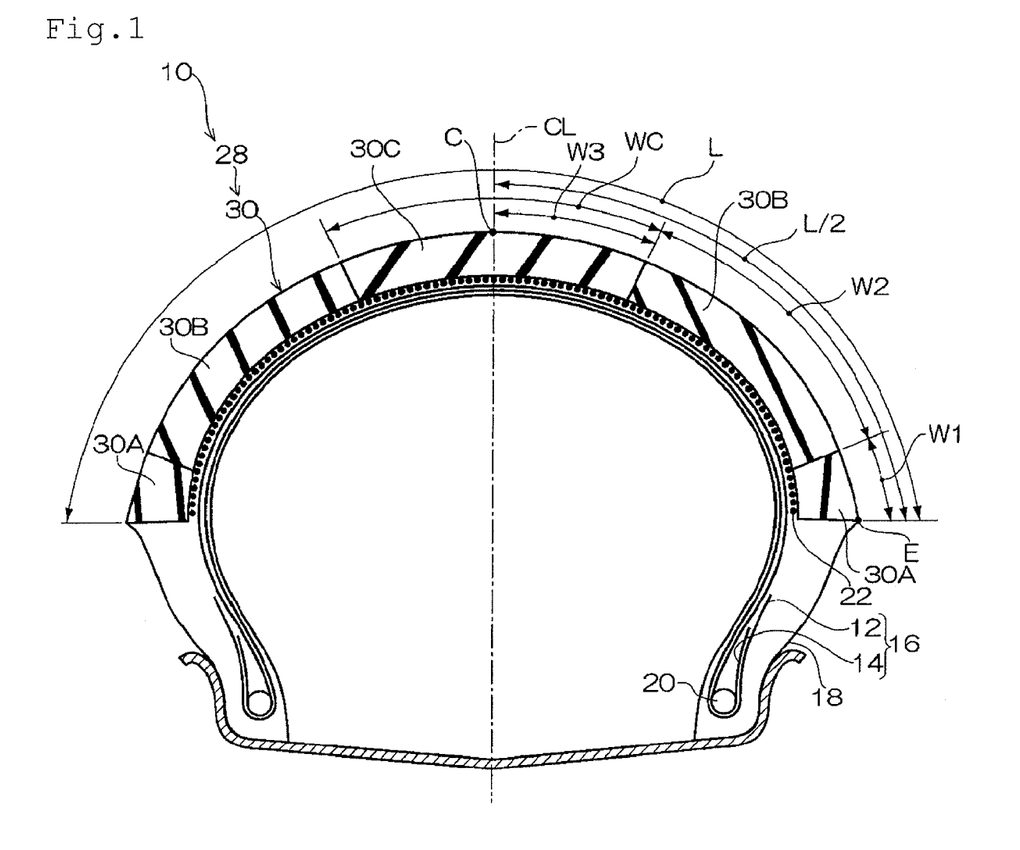
FIG. 1 is a cross-sectional view of a pneumatic tire for two-wheeled vehicles according to a preferred embodiment of the present invention, taken along the rotational axis of the tire.

Referring to FIG. 1, the pneumatic tire 10 for two-wheeled vehicles according to the present invention includes a carcass 16 constituted by a first carcass ply 12 and a second carcass ply 14 each having cords embedded therein so as to extend in directions crossing a tire equatorial plane CL.

(Carcass)

Figure 3:
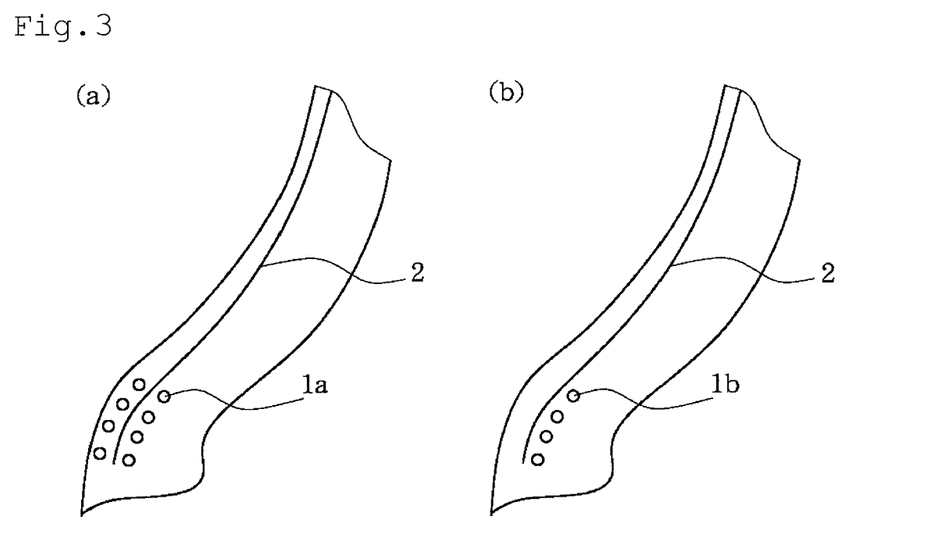
FIGS. 3(A) and 3(B) are partial cross-sectional views each showing a part including an end of a carcass of a pneumatic tire for motorcycles according to another embodiment of the present invention, taken along the width direction.

The first carcass ply 12 and the second carcass ply 14 each have both ends thereof anchored around bead cores 20 that are embedded in respective bead sections 18 by being turned up outward from the tire inner side. The both ends of these carcass plies may either be anchored by being held between bead cores 20a divided into pieces, as shown in FIG. 3(A), or be affixed to bead cores 20b, as shown in FIG. 3(B).

The first carcass ply 12 has a structure in which cords (cords made of organic fiber such as nylon) are embedded parallel to each other in a coating rubber. In this embodiment, the cords are angled at 70 degrees with respect to the tire equatorial plane CL at the point where the cords cross the tire equatorial plane CL. The second carcass ply 14 also has a structure in which cords (cords made of organic fiber such as nylon) are embedded parallel to each other in a coating rubber. In this embodiment, the cords are angled at 70 degrees with respect to the tire equatorial plane CL at the point where the cords cross the tire equatorial plane CL. The cords of the first carcass ply 12 and the cords of the second carcass ply 14 cross each other and are oriented in opposite directions with respect to the tire equatorial plane CL. In this embodiment, the first carcass ply 12 and the second carcass ply 14 are made of nylon.

(Spiral Belt Layer)

The carcass 16 adjoins, on the outer side thereof in the tire radial direction, a spiral belt layer 22. The spiral belt layer 22 is formed by, for example, spirally winding a long rubber-coated cord in which a piece of cord is coated with an unvulcanized coating rubber, or a belt-like ply in which a plurality of cords are coated with an unvulcanized coating rubber. The angle between each cord and the tire equatorial plane CL is set to substantially 0 degrees (about 0 to 3 degrees). The cords used for the spiral belt layer 22 may be composed of either organic fiber cord or steel cord.

The spiral belt layer 22 of the embodiment is formed by spirally winding, in a direction of the axis of tire rotation, a belt-like member in which two parallel cords (steel cords in which steel wires having a diameter of 0.21 mm are twisted in a 1×3 manner) are embedded in a coating rubber. In the embodiment, the density of the cords embedded in the spiral belt layer 22 is 30 cords/50 mm.

(Tread)

The spiral belt layer 22 adjoins, on the outer side thereof in the tire radial direction, a tread rubber 30 serving as a tread 28 that contacts the ground. The tread rubber 30 is constituted by a plural pieces of rubber. In the embodiment, in a cross section taken along the tire width direction shown in FIG. 1, regions W1 (side-section shoulder-end regions) spreading on the surface of the tread 28 from respective tread ends (points E) of the tread 28 toward the tire equatorial plane CL (a point CL) are defined as tread rubbers 30A, a region WC (a tread central section) spreading on the surface of the tread 28 from the tire equatorial plane CL toward both tread ends is defined as a tread rubber 30C, and regions W2 (side-section near-center regions) spreading between the tread rubber 30C and the respective tread rubbers 30A are defined as tread rubbers 30B.

When a stretched tread width obtained by stretching the tread 28 with respect to the tire equatorial plane CL as the center of the tread 28 is defined as L, each region W1 is set to fall within the range of 0.04L to 0.13L, and the region WC is set to fall within the range of 0.15L to 0.35L. Further, in the present invention, by setting each region W2 to fall within the range of 0.2L to 0.31L, grip performance during turning can be improved more preferably. Here, the stretched-tread half width between the tire equatorial plane CL and each of the tread ends is defined as 0.5L. Further, as shown in FIG. 1, each tread end is defined as the point E, the intersection of the tire equatorial plane CL and the tread surface is defined as the point C, and each half of the width WC of the tread rubber 30C is defined as W3. The tread 28 of the embodiment is divided in the tire width direction into the tread rubbers 30A, 30B, and 30C. The interfaces between the tread rubbers included in the tread 28 may be either perpendicular or angled to the tread surface.

It is required that, at least at the tread surface, a modulus M1 of the tread rubbers 30A at 100% elongation is set to a value lower than a modulus M2 of the tread rubbers 30B at 100% elongation. Further, it is preferable that the modulus M2 of the tread rubbers 30B at 100% elongation is set to a value lower than a modulus MC of the tread rubber 30C at 100% elongation. These moduli at 100% elongation in the embodiment are obtained by taking the average of measurements at temperatures ranging from 60 to 100° C. by increments of 10° C. Such a temperature range is employed because it is close to the temperature range that is actually employed.

In this case, it is preferable that a ratio M1/M2 of the modulus M1 of the tread rubbers 30A at 100% elongation to the modulus M2 of the tread rubbers 30B at 100% elongation falls within $0.3 \leq M1/M2 \leq 0.95$, and more particularly within $0.5 \leq M1/M2 \leq 0.9$. Further, it is preferable that a ratio M2/MC of the modulus M2 of the tread rubbers 30B at 100% elongation to the modulus MC of the tread rubber 30C at 100% elongation falls within $0.3 \leq M2/MC \leq 0.95$, and more particularly within $0.5 \leq M2/MC \leq 0.9$.

In FIG. 1, the belt layer of the embodiment is constituted only by the spiral belt layer 22. In an alternative embodiment, another belt layer may also be added (for example, a pair of crossing belt layers whose cords cross each other). Moreover, although the tread 28 shown in FIG. 1 has no grooves, the tread 28 may have appropriate draining grooves required when traveling on wet ground.

The tire 10 according to the preferred embodiment is a radial tire. In an alternative embodiment, the tire 10 may be a bias tire.

EXAMPLES

To verify the effect of improved performance of the pneumatic tire for two-wheeled vehicles according to the present invention, a road test for comparing steering performance was implemented by mounting on a vehicle two kinds of pneumatic tires for two-wheeled vehicles fabricated on the basis of Examples according to the present invention and two kinds of pneumatic tires for two-wheeled vehicles fabricated on the basis of Comparative Examples not according to the present invention.

Each of the sample tires is of a tire size 190/50ZR17 and, as shown in FIG. 1, includes bead cores 1, the carcass 16 constituted by two carcass plies 12 and 14 (nylon cords, the cord angle with respect to the tire circumferential direction: ±70°), the spiral belt layer 22 (1×3×0.21 mm steel cords, embedding density: 30 cords/50 mm), and tread rubbers constituting the tread 28 that is provided on the outer side, in the tire radial direction, of the spiral belt layer 22. The tread 28 contacts the ground. The configuration of the tread rubbers constituting the tread 28 was varied as shown in FIGS. 2(A) to 2(D), whereby the sample tires of Examples and Comparative Examples were fabricated.

Comparative Example 1

Figure 2:
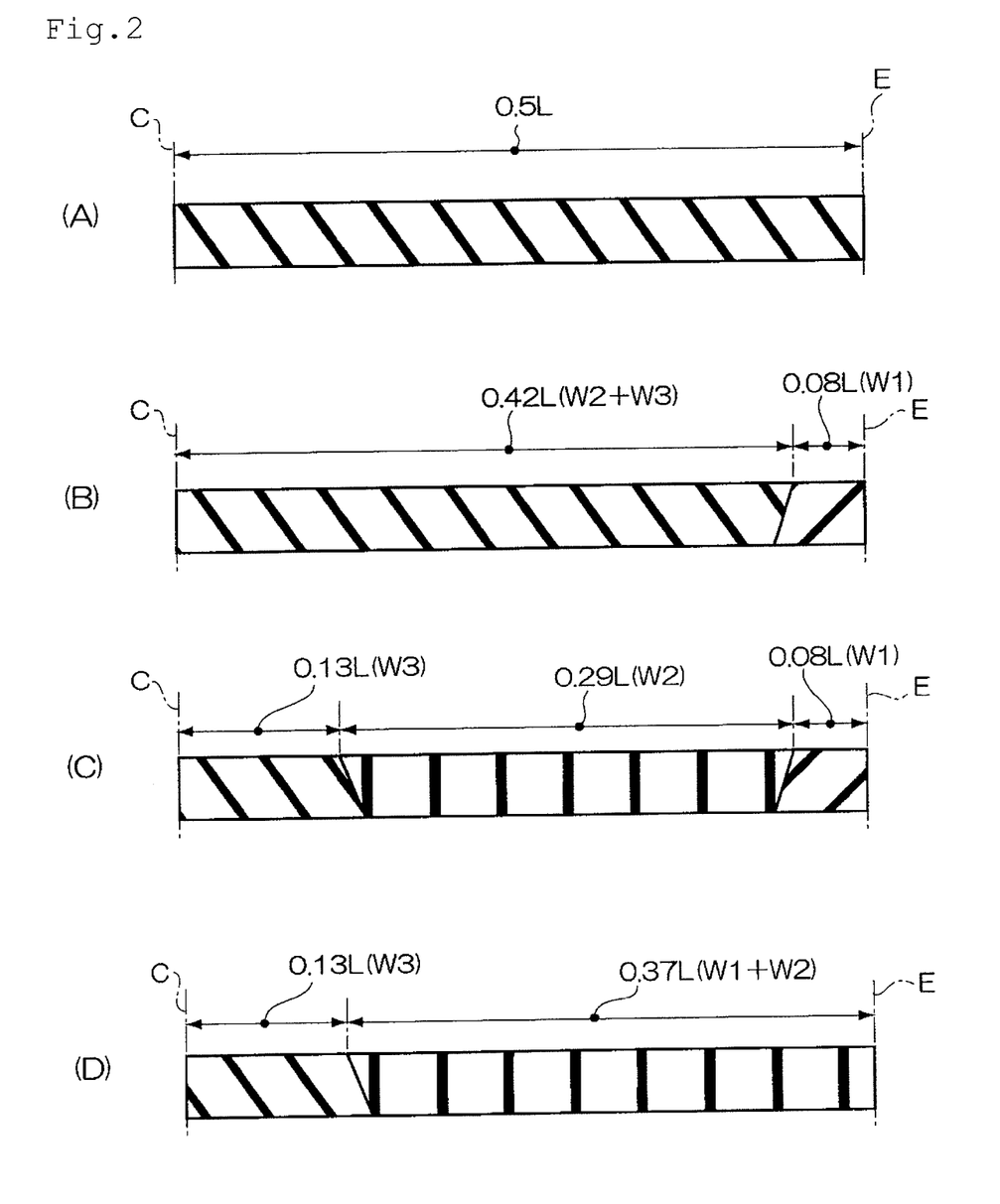
FIGS. 2(A) to 2(D) are cross-sectional views showing stretched tread widths of pneumatic tires for two-wheeled vehicles according to Comparative Example 1, Example 1, Example 2, and Comparative Example 2, respectively, taken along the tire width direction.

The one shown in FIG. 2(A) is the sample tire of Comparative Example 1, in which the tread 28 was constituted by a single kind of tread rubber.

Example 1

The one shown in FIG. 2(B) is the sample tire of Example 1, in which the tread 28 was formed in such a manner that, relative to the stretched-tread half width of 0.5L, the width W1 of the tread rubber 30A was set to 0.08L and that the total width of the width W2 of the tread rubber 30B and the half width W3 of the tread rubber 30C was set to 0.42L, and in which the ratio of the moduli M1, M2, and MC of the respective tread rubbers 30A, 30B, and 30C at 100% elongation was set to 65:100:100. The tread rubber 30B and the tread rubber 30C were composed of the same rubber.

Example 2

The one shown in FIG. 2(C) is the sample tire of Example 2, in which the tread 28 was formed in such a manner that, relative to the stretched-tread half width of 0.5L, the width W1 of the tread rubber 30A was set to 0.08L; that the width W2 of the tread rubber 30B was set to 0.29L; and that the half width W3 of the tread rubber 30C was set to 0.13L, and in which the ratio of the moduli M1, M2, and MC of the respective tread rubbers 30A, 30B, and 30C was set to 65:80:100.

Example 3

The sample tire of Example 3 has the same tread configuration as in Example 2 shown in FIG. 2(C), except that the ratio of the moduli M1, M2, and MC of the respective tread rubbers 30A, 30B, and 30C was set to 25:50:100.

Example 4

The sample tire of Example 4 has the same tread configuration as in Example 2 shown in FIG. 2(C), except that the ratio of the moduli M1, M2, and MC of the respective tread rubbers 30A, 30B, and 30C was set to 9:30:100.

Example 5

The sample tire of Example 5 has the same tread configuration as in Example 2 shown in FIG. 2(C), except that the ratio of the moduli M1, M2, and MC of the respective tread rubbers 30A, 30B, and 30C was set to 80:90:100.

Example 6

The sample tire of Example 6 has the same tread configuration as in Example 2 shown in FIG. 2(C), except that the ratio of the moduli M1, M2, and MC of the respective tread rubbers 30A, 30B, and 30C was set to 90:95:100.

Comparative Example 2

The one shown in FIG. 2(D) is the sample tire of Comparative Example 2, in which the tread 28 was formed in such a manner that, relative to the stretched-tread half width of 0.5L, the total width of the width W1 of the tread rubber 30A and the width W2 of the tread rubber 30B was set to 0.37L and that the half width W3 of the tread rubber 30C was set to 0.13L, and in which the ratio of the moduli M1, M2, and MC of the respective tread rubbers 30A, 30B, and 30C was set to 80:80:100. This configuration is outside of the scope of the present invention from the viewpoint that the tread rubber 30A and the tread rubber 30B are formed as an integral body.

Comparative Example 3

The sample tire of Comparative Example 3 (not shown) includes the tread 28 which was formed in such a manner that, relative to the stretched-tread half width of 0.5L, the width W1 of the tread rubber 30A was set to 0.03L; that the width W2 of the tread rubber 30B was set to 0.34L; and that the half width W3 of the tread rubber 30C was set to 0.13L. The ratio of the moduli M1, M2, and MC of the respective tread rubbers 30A, 30B, and 30C was set to 65:80:100, the same as in Example 2. This configuration is outside of the scope of the present invention from the viewpoint of the width W1 of the tread rubber 30A.

Comparative Example 4

The sample tire of Comparative Example 4 (not shown) includes the tread 28 which was formed in such a manner that, relative to the stretched-tread half width of 0.5L, the width W1 of the tread rubber 30A was set to 0.14L; that the width W2 of the tread rubber 30B was set to 0.23L; and that the half width W3 of the tread rubber 30C was set to 0.13L. The ratio of the moduli M1, M2, and MC of the respective tread rubbers 30A, 30B, and 30C was set to 65:80:100, the same as in Example 2. This configuration is outside of the scope of the present invention from the viewpoint of the width W1 of the tread rubber 30A.

(Evaluation of Steering Stability Performance During Turning)

An evaluation of the sample tires obtained as above was implemented. Since each of the sample tires was for use as a rear tire, a fixed conventional tire was used as the front tire in the road test, but only the rear tires were exchanged. The evaluation was made for each of the sample tires. The tires were mounted on a 1000-cc sport-type two-wheeled vehicle (motorcycle). The motorcycle was ridden a long distance on a test course. The evaluation was mainly focused on the steering stability (cornering performance) during turning with the vehicle body significantly tilted, and was based on an overall 10-point score rating by the feeling of a test rider. A score of 5.5 is regarded as the lowest limit of performance to be considered marketable. Accordingly, a score over 5.5 is considered to ensure marketability.

The results of the evaluation are shown in Table 1 below, with comments of the test rider.

TABLE 1

| | Steering stability performance during turning (score) | Rider's comment |
|---|---|---|
| Comparative Example 1 | 4 | Comfortable during linear driving, but grip when turning by significantly tilting the body is low, so it is necessary to sufficiently slow down before turning. No feeling of grip reduction after continuous riding. |
| Example 1 | 6 | Grip at the beginning of significantly tilting the body is high, and the motorcycle is turnable at a high speed at full bank. However, grip in the midst of tilting of the body seems low. No feeling of grip reduction after continuous riding. |
| Example 2 | 8 | The more the body is tilted, the higher the grip, so it is possible to enter a corner while keeping a high speed. High and stable grip even at full bank, enabling high-speed turning. No feeling of grip reduction after continuous riding. |
| Example 3 | 7 | More grip when tilting the body than in Example 2, but a feeling of slight grip reduction due to wear after continuous riding. |
| Example 4 | 6 | More grip when tilting the body than in Example 3, but a feeling of more grip reduction due to wear after continuous riding than in Example 3. |
| Example 5 | 7 | More grip when tilting the body than in Comparative Example 1, but the increase is smaller than that in Example 2. No feeling of grip reduction after continuous riding. |
| Example 6 | 6 | Much smaller increase in grip when tilting the body than in Example 5, though still more grip than that in Comparative Example 1. No feeling of grip reduction after continuous riding. |
| Comparative Example 2 | 5.5 | High grip at the beginning of tilting of the body, but no feeling of increase in grip at the end of significant tilting of the body. No feeling of grip increase while increasing the tilt of the body, so less stable during high-speed turning than in Example 2. No feeling of grip reduction after continuous riding. |
| Comparative Example 3 | 5.5 | Less feeling of increase in grip at the end of significant tilting of the body than in Example 2. No feeling of grip increase while increasing the tilt of the body, so less stable during high-speed |

TABLE 1-continued

| | Steering stability performance during turning (score) | Rider's comment |
|---|---|---|
| | | turning than in Example 2. No feeling of grip reduction after continuous riding. |
| Comparative Example 4 | 5.5 | High and stable grip at full bank, the same as in Example 2, enabling high-speed turning. However, feeling of significant grip reduction due to wear during continuous riding. The high full-bank turning speed at the beginning of riding could not be maintained at all. |

(Review of the Results)

Referring to Table 1 above, the results of Comparative Examples 1 and 2 and Examples 1 and 2 will now be reviewed. The results of Comparative Example 1 and Examples 1 and 2 show that reduction of the modulus of a tread rubber used for a region that contacts the ground when the vehicle body is tilted leads to an improvement in grip and turning speed. Further, the comparison of Example 2 and Comparative Example 2 shows that use of a softer rubber for a region that contacts the ground when the vehicle body is tilted more significantly so as to increase grip is effective for increasing turning speed.

The result of Example 4 shows that a setting of values smaller than 30% for both the ratio M2/MC of the rubber modulus (M2) of the side-section near-center region to the rubber modulus (MC) of the tread central section and the ratio M1/M2 of the rubber modulus (M1) of the side-section shoulder-end region to the rubber modulus (M2) of the side-section near-center region is not preferable in terms of grip durability. This is because grip durability in the case where the ratios M2/MC and M1/M2 were both set to 30% tended to be reduced because of wear, although such a setting is very effective for improving grip. Further, the result of Example 6 shows that it is not preferable to set the modulus ratios M2/MC and M1/M2 to values larger than 95% in terms of obtaining sufficient effectiveness. This is because the effect of increasing grip was reduced in the case where the aforementioned modulus ratios were set to 95%. Further, the results of Examples 3 and 5 show that it is more preferable that the modulus ratios M2/MC and M1/M2 are set within the range of 50 to 90%.

Further, the results of Example 2 and Comparative Examples 3 and 4 show that the effect of grip improvement cannot be obtained if the area W1 of the side-section shoulder-end region is as small as 3% of the stretched tread width, and that the effect of grip improvement cannot be maintained because of wear if the area W1 is as large as 14%. Accordingly, it has been verified that, to produce the effect desired in the present invention, the area W1 of the side-section shoulder-end region needs to be set within the range of 4 to 13%.

Considering the above-described results, use of a rubber having a small modulus for a large portion of the tread accelerates wear and, consequently, largely shortens the lifetime of various kinds of performance. For example, in the case where a rubber having a small modulus is used for a portion of the tread of a tire for passenger cars (four-wheeled vehicles) in which almost the entire surface of the tread always contacts the ground, it is easy to assume that wear progresses only at that portion, thereby resulting in it being impossible to obtain sufficient performance including the lifetime of performance. In the case of the present invention, however, where a rubber having a small modulus is used only for each side-section shoulder-end region of a tire for two-wheeled vehicles, since this region contacts the ground only when the vehicle body is significantly tilted, use of rubbers having appropriate moduli for appropriate regions enables realization of sufficient performance including the lifetime of performance. That is, the present invention is effective only when applied to a tire for two-wheeled vehicles.

To identify the appropriate range of an area in which the aforementioned low-modulus rubber is to be provided, another evaluation similar to the one described above was implemented. In this evaluation, sample tires were fabricated in the same manner as in Example 2, except that the half width W3 of the tread central section was set to a fixed value of 0.13L and that the area W1 of the side-section shoulder-end region was varied from 0.01L to 0.15L (1% to 15%) by increments of 0.01L (1%). The results of this evaluation are shown as a graph in FIG. 4.

Figure 4:
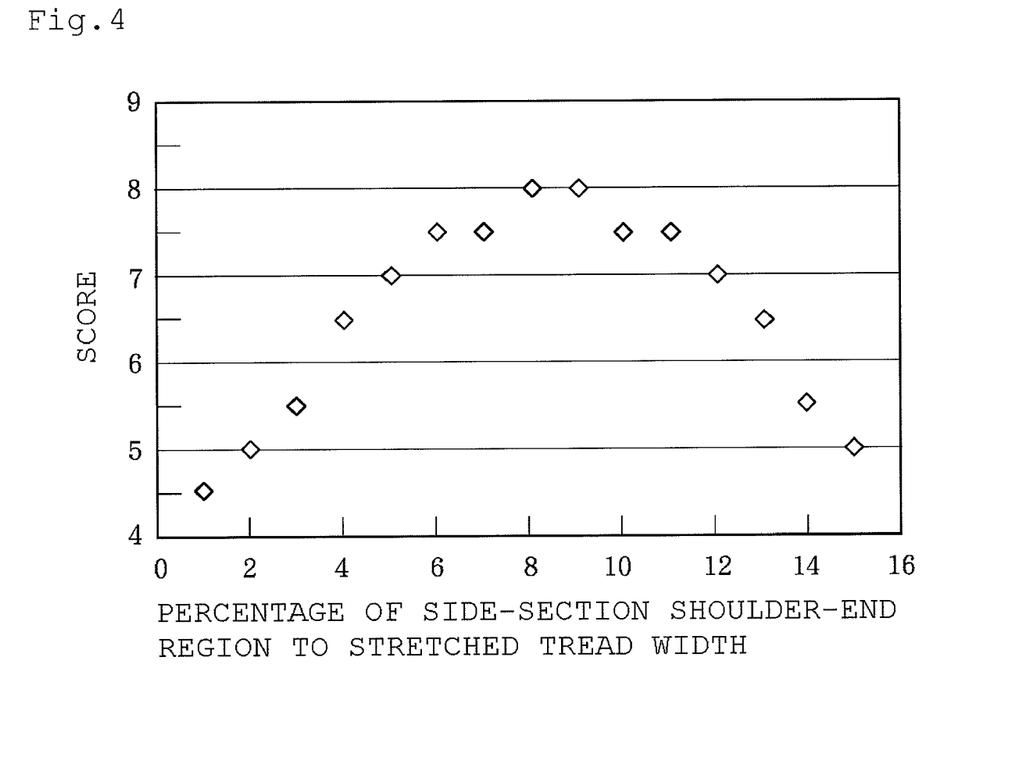
FIG. 4 is a graph showing variations in the results of an evaluation of steering stability performance during turning with respect to the percentage of an area W1 of a side-section shoulder-end region.

As can be seen from FIG. 4, performance obtained when the area W1 of the side-section shoulder-end region is 3% or smaller or 14% or larger relative to the stretched tread width L is insufficient. Thus, it has been found that the effect of performance improvement according to the present invention can be produced by setting the area W1 of the side-section shoulder-end region, for which a low-modulus rubber is used, to 4 to 13% of the stretched tread width L.

The invention claimed is:

1. A pneumatic tire for two-wheeled vehicles comprising: a bead core embedded in each of a pair of left and right bead sections; a carcass constituted by at least one carcass ply toroidally extending from one of the bead sections to the other bead section, with ends of the carcass ply either anchored to the respective bead cores by being wrapped therearound or by being held therein, or affixed to the respective bead cores; a belt layer provided on an outer side, in a tire radial direction, of the carcass; and a plurality of tread rubbers provided on an outer side, in the tire radial direction, of the belt layer and constituting a tread to be brought into contact with the ground, wherein the belt layer includes a spiral belt layer formed by spirally winding a belt-like member in which a single cord or a plurality of parallel cords are embedded in a coating rubber, and wherein, when a region occupying 15 to 35% in the center of a stretched tread width, which is obtained by stretching the tread with respect to a tire equatorial plane as the center, is defined as a tread central section; the remaining regions at both ends of the tread are defined as tread side sections; regions in the respective tread side sections each occupying 4 to 13% from the corresponding tread end toward the center of the stretched tread width are defined as side-section shoulder-end regions; and the remaining regions of the respective tread side sections are defined as side-section near-center regions, a modulus M1 of the tread rubbers for the side-section shoulder-end regions at 100% elongation is smaller than a modulus M2 of the tread rubbers for the side-section near-center regions at 100% elongation, at least at a tread surface.

2. The pneumatic tire for two-wheeled vehicles according to claim 1, wherein a ratio M1/M2 of the modulus M1 of the tread rubbers for the side-section shoulder-end regions at 100% elongation to the modulus M2 of the tread rubbers for the side-section near-center regions at 100% elongation falls within $0.3 \leq M1/M2 \leq 0.95$.

3. The pneumatic tire for two-wheeled vehicles according to claim 2, wherein the ratio M1/M2 of the modulus M1 of the tread rubbers for the side-section shoulder-end regions at 100% elongation to the modulus M2 of the tread rubbers for the side-section near-center regions at 100% elongation falls within $0.5 \leq M1/M2 \leq 0.9$.

4. The pneumatic tire for two-wheeled vehicles according to claim 3, wherein the modulus M2 of the tread rubbers for the side-section near-center regions at 100% elongation is smaller than a modulus MC of the tread rubber for the tread central section at 100% elongation, at least at the tread surface.

5. The pneumatic tire for two-wheeled vehicles according to claim 2, wherein the modulus M2 of the tread rubbers for the side-section near-center regions at 100% elongation is smaller than a modulus MC of the tread rubber for the tread central section at 100% elongation, at least at the tread surface.

6. The pneumatic tire for two-wheeled vehicles according to claim 1, wherein the modulus M2 of the tread rubbers for the side-section near-center regions at 100% elongation is smaller than a modulus MC of the tread rubber for the tread central section at 100% elongation, at least at the tread surface.

7. The pneumatic tire for two-wheeled vehicles according to claim 6, wherein a ratio M2/MC of the modulus M2 of the tread rubbers for the side-section near-center regions at 100% elongation to the modulus MC of the tread rubber for the tread central section at 100% elongation falls within $0.3 \leq M2/MC \leq 0.95$.

8. The pneumatic tire for two-wheeled vehicles according to claim 7, wherein the ratio M2/MC of the modulus M2 of the tread rubbers for the side-section near-center regions at 100% elongation to the modulus MC of the tread rubber for the tread central section at 100% elongation falls within $0.5 \leq M2/MC \leq 0.9$.

* * * * *